(12) United States Patent
Khullar et al.

(10) Patent No.: US 6,400,928 B1
(45) Date of Patent: Jun. 4, 2002

(54) METHOD AND SYSTEM FOR BLIND DETECTION OF MODULATION

(75) Inventors: Anders Khullar, Bjärred; Niklas Stenström, Helsingborg, both of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/443,932

(22) Filed: Nov. 19, 1999

(51) Int. Cl.[7] ............................................. H04L 27/00
(52) U.S. Cl. ................. 455/67.1; 455/67.3; 455/67.4; 455/102; 375/237; 375/238; 375/242
(58) Field of Search ............................. 455/67.1, 67.3, 455/67.4, 68, 71, 73, 39, 142, 143, 101, 102, 144, 110, 108; 375/224, 231, 237, 238–243

(56) References Cited

U.S. PATENT DOCUMENTS

| | | | |
|---|---|---|---|
| 5,289,476 A | | 2/1994 | Johnson et al. ............ 371/37.1 |
| 5,347,542 A | * | 9/1994 | Kurby et al. ................ 375/286 |
| 5,377,256 A | | 12/1994 | Franklin et al. .............. 379/59 |
| 5,479,482 A | | 12/1995 | Grimes ......................... 379/59 |
| 2002/0004400 A1 | * | 1/2002 | Fischer et al. .............. 455/456 |

FOREIGN PATENT DOCUMENTS

EP          0984595      *    8/2000     ............ H04L/27/00

OTHER PUBLICATIONS

Azzouz, et al.; "Automatic Identification of Digital Modulation Types" *Signal Processing* 1995; pp. 55–69.

European Patent Office; Standard Search Report; Aug. 31, 2000.

A. Furuskär, M.. Höök, C. Johansson, S. Jäverbring, K.Zangi, "EDGE–Enhanced Data Rates for GSM and IS–136 Evolution".

* cited by examiner

*Primary Examiner*—Daniel Hunter
*Assistant Examiner*—Pablo N Tran
(74) *Attorney, Agent, or Firm*—Jenkens & Gilchrist, P.C.

(57) ABSTRACT

A method and system for blind detection of modulation in a wireless telecommunications network. In accordance with the method and system, a plurality of bursts are transmitted over an air interface to a receiving station using a first modulation scheme. Modulation detection statistics for the plurality of received bursts are calculated at the receiving station. Based on the modulation statistics, however, it is determined that at least one of the plurality of received bursts has been transmitted using a second modulation scheme. As a result, the modulation detection statistics are analyzed to identify a single modulation scheme that was most likely used in modulating the plurality of bursts. Any faulty received bursts, for which a detected modulation scheme differs from the identified single modulation scheme, are then processed to reduce the effect of the faulty bursts.

33 Claims, 4 Drawing Sheets

METHOD AND SYSTEM FOR BLIND DETECTION OF MODULATION

BACKGROUND OF THE INVENTION

1. Technical Field of the Invention

The present invention relates in general to wireless communication systems, and in particular to blind detection of modulation schemes in wireless data communications.

2. Description of Related Art

In connection with the development of third generation mobile communication systems, new wireless multimedia and data applications are being designed and introduced. To support these new applications, improved data transmission technologies are also being developed. One such technology is Enhanced Data rates for Global Evolution (EDGE), which uses a more efficient air-modulation technology that is optimized for data communications and that can be implemented on existing GSM and IS-136 systems. When used in connection with General Packet Radio Service (GPRS), a packet-switched technology that delivers speeds of up to 115 kilobits per second (kbit/s), EDGE technology can increase end user data rates up to 384 kbit/s, and potentially higher in high quality radio environments.

In accordance with EDGE technology, data is transferred in packets via a wireless communication link. A sequence of four consecutive bursts is used for transferring one or two blocks of data. The EDGE system operates according to Link Quality Control (LQC) methods that estimate the predicted channel conditions and, as a result of the estimates, switch a radio transmitter that is used for the data transmissions between robust and less robust modulation schemes. According to EDGE specifications, the four consecutive bursts are transmitted using the same modulation. The four burst sequence can be modulated, for example, using either gaussian minimum shift keying (GMSK) or linear 8-phase shift keying (8-PSK), depending on channel quality predictions. To improve the bit rate to achieve high quality performance, the modulation scheme for the wireless communication link has to change very quickly, without being signaled in advance. As a result, a receiver to which the data packets are being transmitted utilizes blind detection of modulation. In other words, the receiver detects the type of modulation used for each burst based on an analysis of the burst pattern itself.

To accurately receive data, it is important that the receiver detect the type of modulation correctly. If one burst's modulation scheme is incorrectly detected, one quarter of the bits in the block will be corrupted, thereby preventing accurate data reception. In fact, incorrect detection is actually worse than if one burst is completely lost because the corrupted symbols will have "soft values," which relate to the probability that the bit or bits encoded in each symbol have certain values, that are different than zero. Each soft value will thus favor a bit decision of either a "zero" or a "one." The soft values, however, are only valid under the assumption that the correct modulation type was detected during the blind detection procedure. Moreover, depending on the modulation type, each symbol represents a different number of bits. In 8-PSK modulation, for instance, each symbol represents three bits. If the modulation type is not correctly detected, the number of bits assumed to be encoded in each symbol will also be erroneous. In addition, if the Uplink State Flags in the bursts are not correctly decoded by a mobile station that is receiving the transmission, the mobile station might start a transmission at the wrong time, thereby causing interference in the system.

One possible solution for improving the modulation detection decision process is to perform a "brute force" search, in which the received signals are demodulated according to all of the possible modulation schemes (e.g., through parallel demodulation) and the resulting demodulated signals are analyzed to identify the result that is most likely correct. The problem with this solution is that it requires large amounts of memory and/or additional processing power, which means that this solution is expensive and places an excessive drain on limited resources.

There is a need, therefore, for a method and system for improving receiver performance in connection with burst-wise modulation detection. Such a method and system would preferably improve the accuracy and reliability of blind detection of modulation without requiring large amounts of memory and/or processing resources. In addition, such a method and system would preferably avoid a situation in which an incorrect detection of the modulation scheme is actually worse than a loss of a burst. Furthermore, such a method and system would preferably improve the reliability of Uplink State Flag detections.

SUMMARY OF THE INVENTION

The present invention comprises a method and system for blind detection of modulation in a wireless telecommunication network. In accordance with the method, a first modulation scheme is selected for use in transmitting a plurality of bursts. Preferably, the first modulation scheme is selected according to a current channel quality of a radio link between a transmitting station and a receiving station. The plurality of bursts are modulated using the selected first modulation scheme and are received at the receiving station.

After each of the plurality of bursts is received, modulation detection statistics are calculated for each burst. Preferably, the modulation detection statistics include a correlation quality measure between a known training sequence and a training sequence contained within each received burst. Using these modulation detection statistics, a probable modulation scheme that was likely used in transmitting the burst is identified. Once a probable modulation scheme for each of the plurality of received bursts is identified, the various probable modulation schemes are compared to determine if they all match. If not, then the modulation detection statistics are analyzed to identify a single modulation scheme that was most likely used in modulating all of the plurality of bursts.

In accordance with one embodiment of the invention, the modulation detection statistics are analyzed to determine if a majority of the identified probable modulation schemes match. For example, it is determined whether the same modulation scheme has been detected for three out of four bursts. If so, then a "majority vote" is taken and the modulation scheme detected for a majority of the received bursts is selected as the single modulation scheme most likely used in modulating all of the bursts.

In some cases, however, an examination of the identified probable modulation schemes will not reveal a majority. For example, if four bursts are transmitted and received, the identified likely modulation scheme for two of the received bursts might differ from the identified probable modulation scheme for the other two bursts. In accordance with another embodiment of the invention, therefore, additional modulation detection information is analyzed to identify the single modulation scheme most likely used in modulating all of the bursts. This additional information can include correlation quality measurements between a known training sequence and the training sequence contained within each of the bursts. Alternatively, this additional information can include historical modulation scheme information or, as an additional alternative, data indicating a bias toward a particular modulation scheme.

In accordance with yet another embodiment of the invention, any faulty bursts for which the probable modulation scheme differs from the identified single modulation scheme are processed to reduce the effect of the faulty bursts. In particular, soft values, which relate to a probability that each symbol in the received bursts has a particular value, are altered for any of the received bursts for which the initially identified probable modulation scheme differs from the identified single modulation scheme. Preferably, such soft values are altered by setting them to a predefined value indicating that each symbol value has equal probability, thus preventing the faulty burst from having an adverse impact on proper decoding of the demodulated bursts. For instance, the predefined value can be zero.

In accordance with the system of the invention, a wireless data communication system includes a receiving station for receiving a plurality of burst signals that are transmitted over an air interface. The receiving station is capable of blind detection of modulation schemes that are used to transmit the plurality of burst signals. The receiving station includes at least one channel estimation device, a modulation detection unit, and a modulation correction unit. The at least one channel estimation device is used for calculating modulation detection statistics for each of the plurality of received burst signals.

The modulation detection unit analyzes these modulation detection statistics for each received burst signal to identify a probable modulation scheme for that received burst signal. Once a probable modulation scheme has been identified for each of the plurality of burst signals, the modulation correction unit compares the various probable modulation schemes to determine whether they all match. If not, the modulation correction unit selects a single modulation scheme most likely used in modulating the plurality of burst signals. This selection can be made using a majority vote procedure for the identified probable modulation schemes or by examining additional modulation detection information to determine a modulation scheme that was most likely used for all of the plurality of burst signals.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
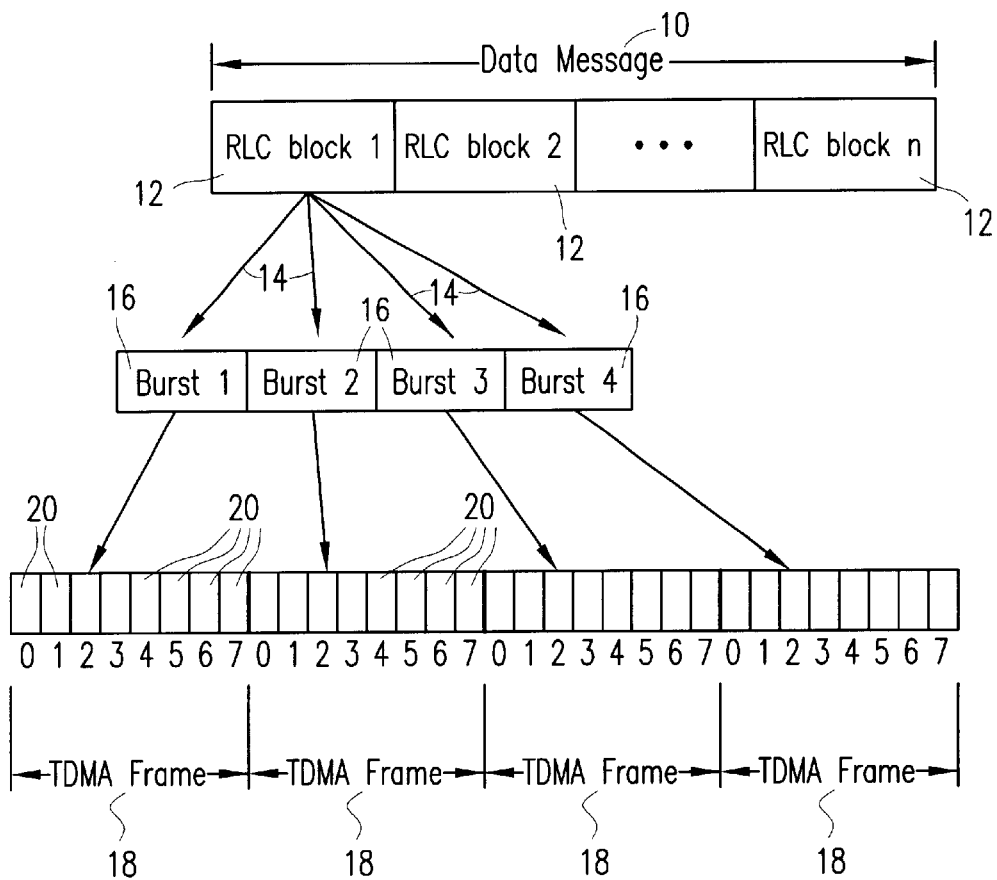
FIG. 1 is a diagram exemplifying a segmentation of data in connection with Enhanced Data rates for Global Evolution (EDGE) technology.

Reference is now made to the Drawings wherein like reference characters denote like or similar parts throughout the various Figures. In the preferred embodiment of the invention, modulation detection statistics are analyzed to improve the accuracy and reliability of blind modulation detection in Enhanced Data rates for Global Evolution (EDGE) technology. However, although the invention is described herein in connection with EDGE technology and with current EDGE modulation schemes, it will be understood that the invention is applicable in other areas where burst-wise or blind detection of modulation is used and where other types of modulation schemes (e.g., quadrature phase shift keying (QPSK)) are used.

EDGE supports two modulation schemes: linear 8 PSK and GMSK. In the current version of EDGE packet data transfer mode, five different coding rates can be used with 8 PSK modulation and four different coding rates can be used with GMSK modulation. These various coding and modulation schemes correspond to data rates from about 9.05 kilobits per second (kbps) to about 69.2 kbps. EDGE technology provides improved data rate transmissions by relying upon link adaptation to select the best combination of modulation and coding for each individual radio link. In particular, data is transmitted using the modulation and coding scheme that achieves the highest radio interface packet bit rate for the current channel quality.

Furthermore, the transmission system quickly adapts the modulation and coding scheme without sending advance notification to the receiver. This aspect of EDGE improves the overall transmission rate by allowing the transmission system to take advantage of periods in which there is high channel quality by using a modulation and coding combination that increases the current data transmission rate. Such rapid modulation and coding changes are possible because the transmission system does not notify the receiver in advance of the changes. Thus, the receiver uses a blind modulation detection procedure to determine the type of modulation used for received data messages.

Referring now to FIG. 1, there is shown a diagram exemplifying a segmentation of data in connection with EDGE technology. Because EDGE is designed to be compatible with existing Global System for Mobile Communications (GSM) systems, the data is processed and arranged for transmission in EDGE in much the same way as in GSM. In particular, a data message 10 to be sent over a wireless interface is segmented into a number of Radio Link Control (RLC) blocks 12. Each RLC block 12 is block encoded (including the addition of Uplink State Flags (USFs)), convolution encoded, and interleaved, and the resulting data structure is mapped (as indicated at 14) into a sequence of four consecutive bursts 16. The bursts 16 are then modulated using an appropriate modulation and coding scheme, as selected depending upon the current channel quality. Each set of four bursts 16 are modulated using the same modulation and coding scheme. Then, each burst 16 is transmitted over the air interface in a TDMA time slot 20 that has been assigned to the receiver. Generally, GSM radio channels are divided into TDMA frames 18, each of which includes eight time slots 20. In this case, it is assumed that time slot 2 has been assigned for use by the intended receiving station of the data message 10. Thus, the four bursts 16 are transmitted in time slot 2 of four consecutive TDMA frames 18.

After each of the four bursts 16 is received at the receiving station, a correlation quality measure is made for purposes of determining which modulation scheme should be used to demodulate the received signals. For example, each burst 16 includes a training sequence, which is a known bit sequence. In EDGE technology, the same bit sequence is used for both GMSK and 8 PSK modulation. However, the training sequence is rotated ninety (90) degrees (i.e., π/2) in one direction for GMSK modulation, while the training sequence is rotated sixty-seven and a half (67.5) degrees (i.e., 3π/8) in the other direction for 8 PSK modulation.

By correlating the received training sequence for each burst 16 with the known training sequence bit pattern, it can be determined which modulation scheme was used for the transmission. The bursts are then demodulated according to the identified modulation scheme, and, during the demodulation, "soft values" are calculated. The soft values represent a probability value for the symbols or bits that are being demodulated. This probability value identifies a certain probability that a particular bit has a value of "one" or "zero." The demodulated signal is de-interleaved and then channel decoded. The soft values are used to help the channel decoder make the correct bit or symbol decisions.

Figure 2:
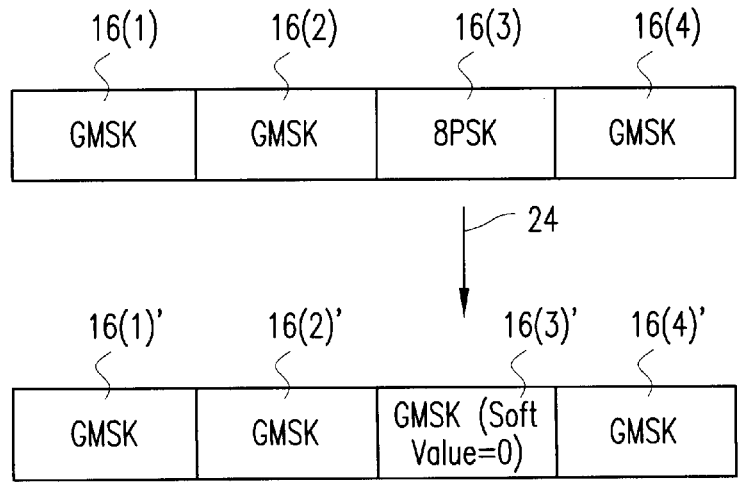
FIG. 2 is one example of a process for improving the blind detection of modulation in accordance with the present invention.

In some cases, however, errors can occur during the modulation detection process. Referring now to FIG. 2, there is illustrated one example of a process for improving the blind detection of modulation in accordance with the present invention. If one of the bursts 16 is determined to have a different modulation scheme than the other three, then a majority vote is taken. In this case, it is assumed that the first, second, and fourth bursts 16(1), 16(2), and 16(4) are determined to have been originally modulated using GMSK, while the third burst 16(3) is determined to have been modulated using 8 PSK. By taking a majority vote, it is determined that modulation scheme identification for the third burst 16(3) is faulty. Accordingly, the detected modulation scheme for the third burst 16(3) is converted (as indicated at 24) into GMSK, and all four of the bursts 16(1)', 16(2)', 16(3)', and 16(4)' are further processed under the assumption that they were originally modulated using GMSK. For example, because GMSK consists of one bit per symbol and 8-PSK consists of 3 bits per symbol, a conversion from an 8-PSK burst to a GMSK burst is made by changing the burst symbols from three bits and three soft values to symbols with one bit and one soft value, where the single soft value is set to a predefined value, e.g. zero, indicating that the bit decision of a "one" and a "zero" has equal probability. Thus, the conversion involves adjusting the bits per symbol together with zeroing the soft information. Similarly, in converting from a GMSK burst to an 8-PSK burst, the burst symbols are changed from one bit and one soft value to symbols with three bits and three soft values, where the three soft values are set to a predefined value.

In addition, because of the detected fault in the third burst 16(3), it is assumed that the entire burst 16(3) is relatively or completely unreliable. Thus, the soft values for the converted third burst 16(3)' are set to zero, indicating that it is equally probable that each bit has a value of "one" as a value of "zero", (i.e., neither bit value decision is favored over the other). Alternatively, the soft values for the converted third burst 16(3)' are adjusted in some other way to reduce, or otherwise alter, the effect of the converted third burst 16(3)' during subsequent decoding. This operation enhances the decoding process because soft information that is known to be erroneous is not used to decode the demodulated signals. Instead, best effort probability information is used to decode the demodulated signals.

In particular, the best effort probability decoding relates to the convolution and interleaving procedures. For example, during encoding, the data is subjected to a convolution process and then distributed across the four bursts through interleaving (i.e., allowing there to be some redundancy and robustness in the coding). As a result, if the data in one burst is treated during decoding in a way that does not cause the channel decoder to favor one bit decision over the other (i.e., the soft values for that burst are set to zero), the data in the other three bursts can be relied upon more heavily to attempt to correctly decode (or make a best effort at correctly decoding) the transmitted data.

However, the ability to successfully decode the data contained in the four bursts when the soft values for one of the bursts are set to zero (or are otherwise adjusted to prevent that one burst from adversely affecting the bit decisions) depends on the coding rate used. For example, if the highest coding rate in 8 PSK is used (i.e., 1384 bits for each RLC block), there is no data redundancy and little or no robustness. Thus, best effort probability information would not result in successful decoding, and the data would have to be resent. On the other hand, the lower the coding rate, the greater the redundancy and the more robustness of the data transmission. Accordingly, the best effort probability information is more likely to allow for successful decoding in cases where lower coding rates are used.

Taking a majority vote and setting the soft values for the converted third burst 16(3)' to zero also improves the quality of the data communication in other ways as well. For example, these steps improve the processing and decoding of the USFs, which helps to prevent the receiving device from starting uplink transmissions at the wrong time. In contrast to the ordinary transmitted data, USFs are protected by redundant coding. Thus, the procedures of the invention enhance the USF detection process regardless of the coding rate that is used. These steps also reduce the risk of faulty receptions of data transmissions. In other words, the risk of errors in the receiving and decoding process is reduced.

In some cases, the initial decoding might fail because, for instance, not enough reliable information is received to accurately decode the received signals or because an analysis of parity bits included in the transmitted bursts indicate that an attempt to decode the bursts is erroneous. In such a case, the information in the four burst sequence is re-transmitted, which allows improved decoding after the retransmission and soft combining. In particular, bits and soft values for blocks that are not decoded correctly are saved in memory (at least for those bursts that are determined to be correctly received), and the stored soft values are combined with the soft values for the re-transmitted blocks to improve decoding after the retransmission.

In accordance with another embodiment of the invention, blind detection of modulation can also be improved when two of the four bursts have a different detected modulation scheme than the other two bursts. In such a case, a simple majority vote procedure will not result in a selection of a particular modulation scheme. In this situation, additional information is used in an attempt to identify the correct modulation scheme for the four burst sequence. Referring again to FIG. 2, it is assumed in this case that only the first and fourth bursts 16(1) and 16(4) are determined to have been modulated using GMSK, while the second and third bursts 16(2) and 16(3) are determined to have been modulated using 8-PSK. A majority vote does not reveal any preference for one modulation scheme over the other. Accordingly, an attempt to identify the appropriate modulation scheme, absent a random selection, requires the use of additional information. Such additional information might reveal that it is more probable that the four-burst sequence was originally modulated using GMSK. Thus, the detected modulation scheme for the second and third bursts 16(2) and 16(3) are converted into GMSK, and all four of the bursts 16(1)', 16(2)', 16(3)', and 16(4)' are further processed under the assumption that they were originally modulated using GMSK.

In one embodiment, the additional information comprises the values of the correlation quality measures that are made after the four-burst sequence is received. Accordingly, the correlation quality measurements for each of the four bursts are evaluated to identify the more likely modulation scheme. For example, if two of the bursts highly correlate with a training sequence rotation that indicates GMSK modulation, while the correlation quality measures for the other two bursts only slightly favor 8-PSK modulation, then it can be presumed that GMSK modulation was used during transmission and should therefore be used to process all four of the bursts.

In another alternative, historical modulation information can be used to bias the modulation detection mechanism. In this situation, if the results of the correlation quality measurements are inconclusive (i.e., two of the four bursts are detected as having a different modulation scheme than the other two bursts), the modulation detection mechanism can examine a memory that stores data indicating the type of modulation that was used for a selected number of previous four-burst sequences. This data can then be used to help select the type of modulation scheme to be used for demodulating the signals. For instance, if the preceding three four-burst sequences have used 8-PSK modulation, then it might be more likely that the current four-burst sequence also uses 8-PSK modulation. Therefore, if the modulation detection process is inconclusive, the historical information can be used to select 8-PSK modulation as the appropriate modulation scheme.

In yet another alternative, a detection that two out of the four bursts have a particular modulation scheme, while the other two have a different detected modulation scheme, might favor a selection of one type of modulation over the other. For example, the fact that the modulation detection process is inconclusive would typically suggest that relatively poor conditions exist on the radio channel. Thus, the modulation detection mechanism could be preprogrammed to exhibit a bias toward GMSK modulation, as opposed to 8-PSK modulation, in such a case. A selection of this type of bias is because, if poor radio conditions exist, it is likely that a more robust modulation scheme would have been selected for transmitting the four-burst sequence. Accordingly, because GMSK modulation is more robust than 8-PSK modulation, the bias would preferably favor GMSK modulation.

Figure 3:
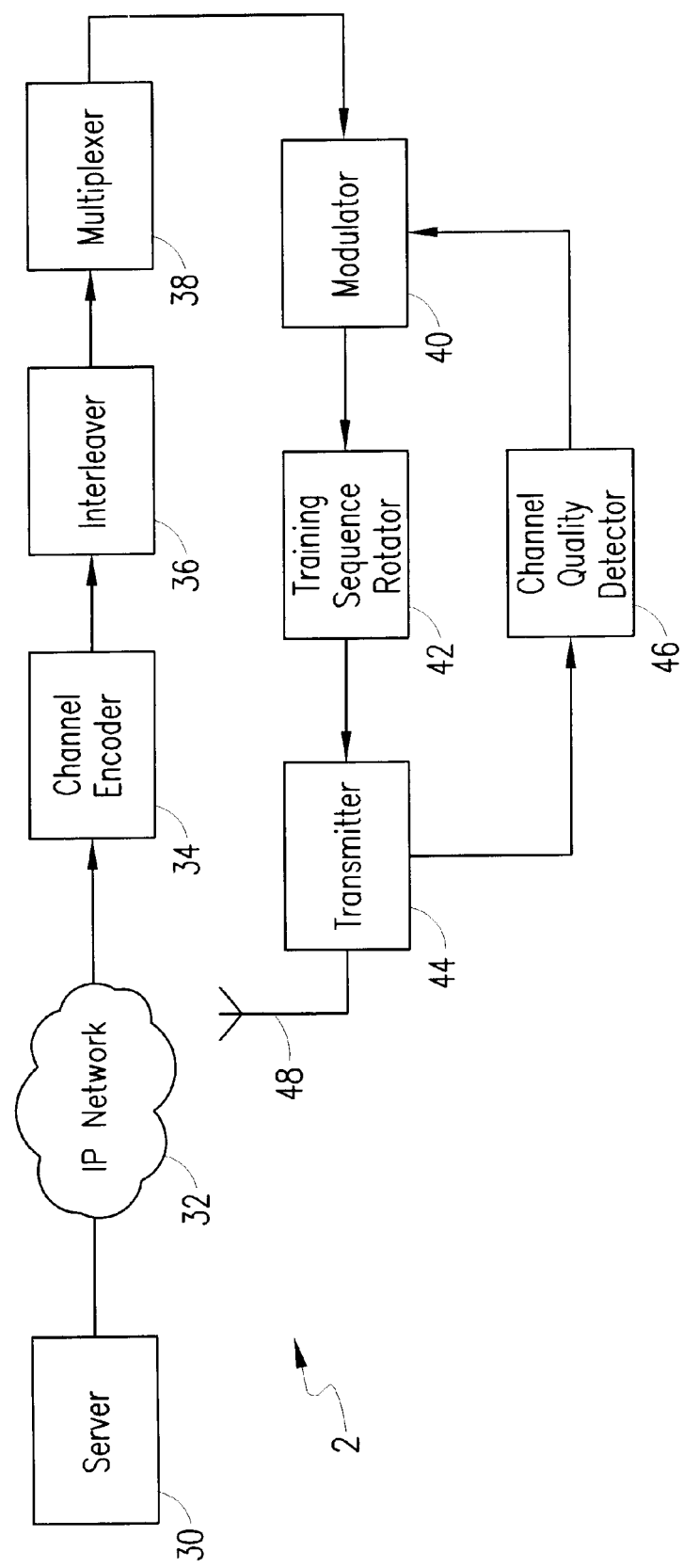
FIG. 3 is a block diagram of the network side of a system for implementing EDGE technology.

Referring now to FIG. 3, there is illustrated a block diagram of the network side of a system 2 for implementing EDGE technology. The system 2 is designed for transmitting data messages from a server 30 to a receiving station (see FIG. 4). Data messages are transmitted from the server 30 over an IP network 32 to a channel encoder 34. After segmenting the data messages into RLC blocks 12, each RLC block 12 is block encoded and convolutional encoded by the channel encoder 34. The resulting encoded bit sequence is then interleaved and formed into four bursts 16 by an interleaver 36. The four bursts 16 are fed into a multiplexer 38 that places the bursts 16 in a selected time slot 20 of four consecutive TDMA frames 18 on an appropriate radio channel (see FIG. 1). In particular, each radio channel in GSM is divided into eight time slots 20 that are used for communicating up to eight different data streams. Each receiving station is typically allocated one or more time slots 20 of a particular radio channel that are used for communications with that receiving station. Accordingly, the multiplexer 38 functions to place bursts 16 from up to eight different data streams into their respective allocated time slots 20.

Next, the four bursts 16 to be transmitted to the receiving station are modulated by a modulator 40. The particular modulation scheme used by the modulator 40 is selected in accordance with the current channel quality of the air interface between a transmitter 44 on the network side of the system 2 and the receiving station. The current channel quality is determined by a channel quality detector 46 that receives and analyzes information about communications on the radio channel from the transmitter 44. If the current channel quality is relatively high, a less robust modulation and coding scheme can be used, thereby maximizing the data rate on the air interface. Conversely, if the current channel quality is relatively low, a more robust modulation and coding scheme is used so as to increase the probability of accurate transmission and reception of the transmitted data.

After the bursts 16 are modulated using the selected modulation and coding scheme, the training sequence is rotated using a rotation that corresponds to the selected modulation scheme (e.g., $\pi/2$ for GMSK or $3\pi/8$ for 8-PSK). The modulated bursts 16 with the rotated training sequences are then forwarded to the transmitter 44, which transmits the bursts 16 over the air interface as part of the TDMA frames 18.

Figure 4:
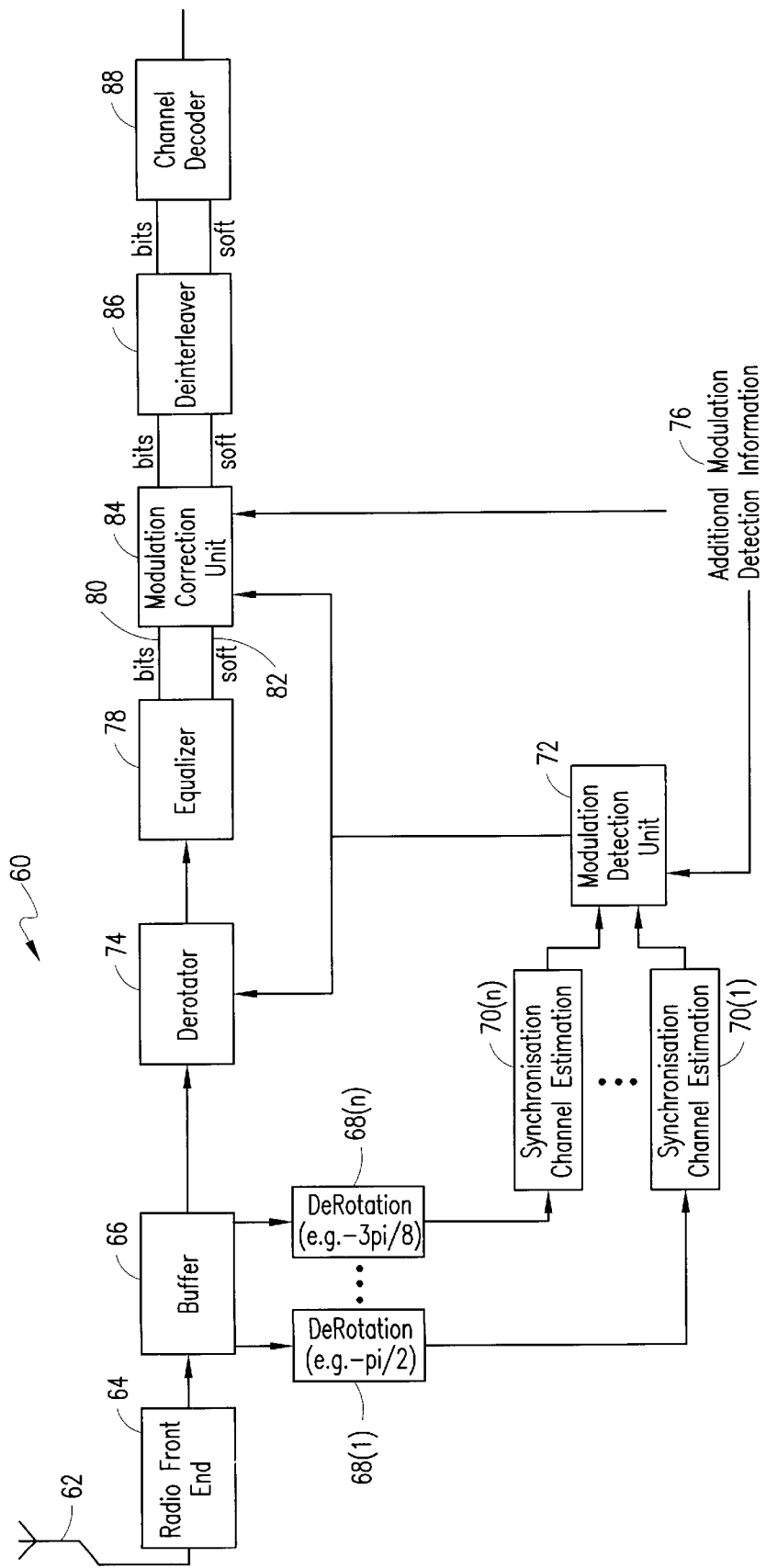
FIG. 4 is a block diagram of a receiving station for receiving data transmitted using EDGE technology in accordance with the present invention.

Referring now to FIG. 4, there is illustrated a block diagram of the receiving station 60 for receiving data transmitted using EDGE technology in accordance with the present invention. The receiving station 60 includes an antenna 62 and a radio front end section 64 for receiving the bursts 16 that are transmitted in the time slot or slots 20 that have been allocated to the receiving station 60. Each burst 16 of the four-burst sequence is received, one at a time, and is stored in a buffer 66 while the training sequence for the burst 16 is analyzed to identify the applicable modulation scheme for the burst 16. To perform this analysis, the training sequence contained within the particular burst 16 is fed from the buffer 66 to each of a plurality of de-rotation blocks 68. The receiving station 60 includes one de-rotation block 68 for each possible modulation scheme. Accordingly, a first de-rotation block 68(1) de-rotates the training sequence according to the rotation used for GMSK, while another de-rotation block 68(n) de-rotates the training sequence according to the rotation used for 8-PSK. In addition, other de-rotation blocks 68 can be included if other modulation schemes are used.

After the training sequence is de-rotated, the various de-rotated signals for the burst 16 that is currently being analyzed are each forwarded to a corresponding synchronization/channel estimation block 70. A first synchronization/channel estimation block 70(1) correlates the de-rotated training sequence from the first de-rotation block 68(1) to the known training sequence to calculate a GMSK correlation quality measure and attempts to synchronize the receiving station 60 with the received burst 16, and another synchronization/channel estimation block 70(n) correlates the de-rotated training sequence from the other de-rotation block 68(n) to the known training sequence to calculate an 8-PSK correlation quality measure and attempts to synchronize the receiving station 60 with the received burst 16. These correlation quality measures are then used by a modulation detection unit 72 to determine which modulation scheme was most likely used for the burst 16. Generally, the correlation quality measure with the highest value will indicate that the modulation scheme that corresponds to that correlation quality measure was used for the transmission. Accordingly, the modulation detection unit 72 selects the corresponding modulation scheme for the burst 16.

Once the appropriate modulation scheme is selected, the modulation detection unit 72 then instructs a derotator 74 to derotate the burst 16 according to the rotation used for the selected modulation scheme. The derotated signals are then analyzed by an equalizer 78. The equalizer 78 demodulates the derotated burst 16 in accordance with the respective modulation scheme selected for the particular burst 16 and creates a mathematical model of the transmission channel (i.e., the air interface) based on the training sequence. The equalizer 78 further processes the data bits of the demodulated signals to generate a most probable bit pattern as well as soft values for each of the bits in the bit pattern. As discussed above, the soft values indicate a probability that each of the bits in the most probable bit pattern is correct. The equalizer 78 forwards the most probable bit pattern (as indicated at 80) and the soft values (as indicated at 82) to a modulation correction unit 84.

Once the modulation detection unit 72 has selected a modulation scheme for each of the four bursts 16, the modulation detection unit 72 forwards data identifying the modulation schemes for each of the four bursts to the modulation correction unit 84, which compares the four selected modulation schemes to determine whether they match. If one of the selected modulation schemes does not match the other three, the modulation correction unit 84 takes a majority vote and converts the selected modulation scheme for the dissimilar burst 16 so that it matches the other three. In addition to the majority vote, the modulation correction unit 84 can also use other modulation detection information 76 to further influence the modulation conversion process.

On the other hand, if a majority vote can not be used to identify a single modulation scheme, or if the majority vote is not sufficiently reliable, the modulation correction unit 84 uses additional modulation detection information 76 to determine the appropriate modulation scheme. This additional modulation detection information 76 can include, for example, the correlation quality measures for the four bursts 16, historical modulation information, or information indicating a bias favoring a particular modulation scheme or schemes.

Accordingly, the modulation correction unit 84 identifies which bursts 16, if any, were initially determined to have a modulation scheme that differs from the identified single modulation scheme. For such a burst 16, the modulation correction unit 84 adjusts the soft values for that burst 16, by setting the soft values to zero, for example, which indicates that each bit of the most probable bit pattern for that burst 16 is equally likely to be a "1" as a "0". This ensures that information received in a burst 16 that is not reliable does not have an adverse effect on the subsequent channel decoding. Next, the most probable bit pattern and soft values, as adjusted by the modulation correction unit 84, are de-interleaved by a de-interleaver 86. Finally, the de-interleaved signals bit pattern is decoded by a channel decoder 88 using the soft values to produce the bit sequence of the original RLC block 12.

Figure 5:
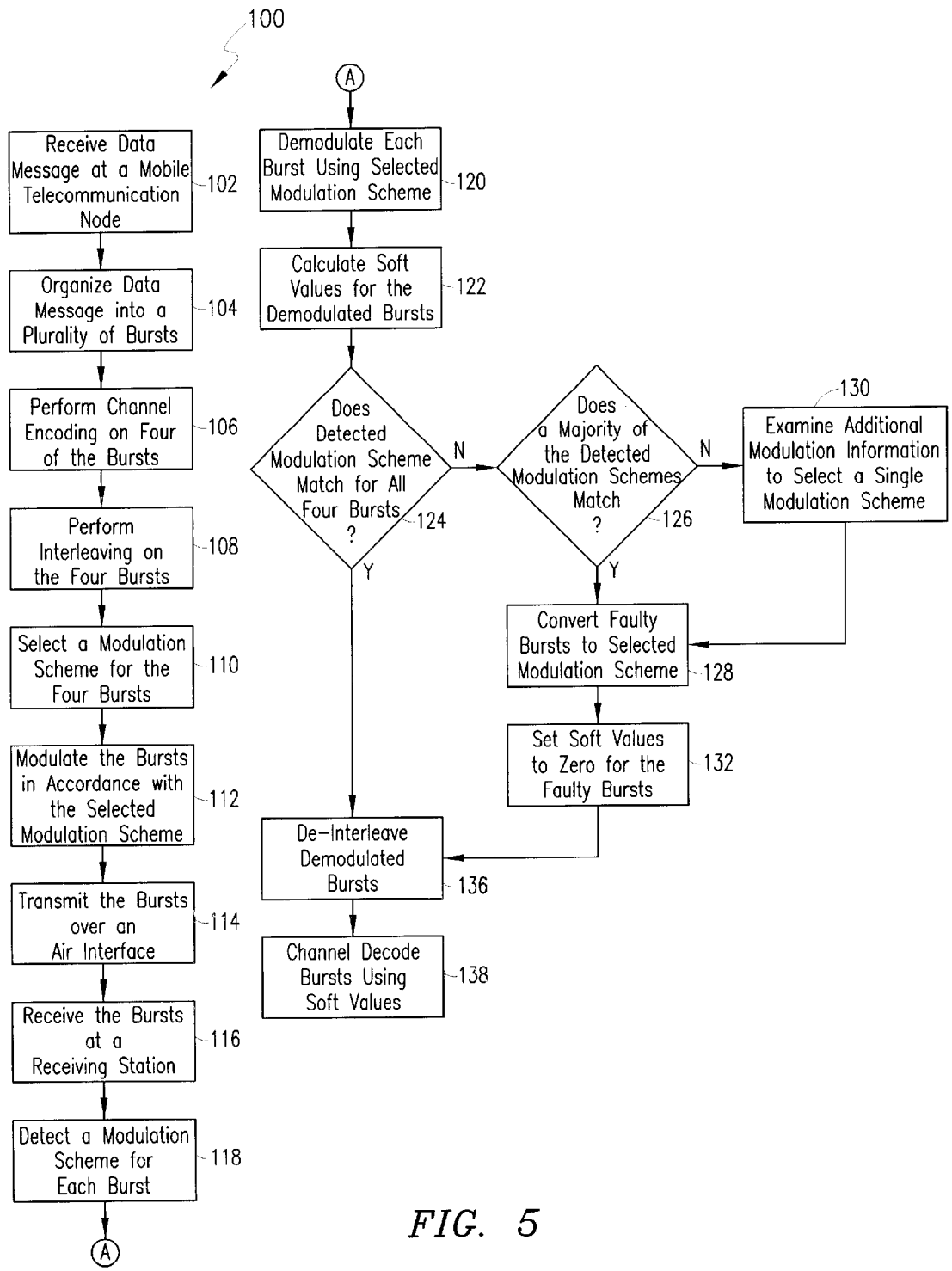
FIG. 5 is a flow diagram depicting a preferred method for implementing blind detection of modulation in accordance with the present invention.

Referring now to FIG. 5, there is illustrated a flow diagram depicting a preferred method 100 for implementing blind detection of modulation in accordance with the present invention. At an initial step 102, data messages to be transmitted to a receiving station are received at mobile telecommunications node. The data messages are organized into a plurality of bursts at step 104, and an initial four of the bursts are channel encoded at step 106. Next, at step 108, the four bursts are interleaved, and a modulation scheme is selected for the bursts at step 110. The selection of a modulation scheme is dependent upon a current channel quality of the radio channel used for communications between the mobile telecommunications node and the receiving station.

The bursts are then modulated in accordance with the selected modulation scheme at step 112 and are transmitted over an air interface at step 114. The bursts are received at a receiving station at step 116, and a modulation scheme for each burst is detected at step 118 using the de-rotation and correlation procedures discussed above. At step 120 each burst is demodulated using the modulation scheme detected at step 118, and soft values for the symbols in each burst are calculated at step 122.

Next, it is determined whether the detected modulation schemes match for all four of the received bursts at step 124. If the detected modulation scheme does not match for all four of the received bursts, then it is determined whether a majority of the detected modulation schemes match (i.e., the same modulation scheme is detected for three of the four received bursts) at step 126. If so, then the modulation scheme that is detected for a majority of the received bursts is selected, and the faulty burst is converted (i.e., by changing the number of bits and the number of soft values) at step 128 to the same modulation scheme as was detected for the majority of the bursts. On the other hand, if a majority decision can not be made, additional modulation detection information is examined at step 130 to select a single modulation scheme to which the faulty bursts are converted at step 128. As discussed above, this additional modulation detection information can include correlation quality measures for the four bursts, historical modulation information, or information indicating a bias favoring a particular modulation scheme or schemes.

Next, the calculated soft values are adjusted to zero at step 132 for any bursts (i.e., faulty bursts) for which the initially detected modulation scheme, as detected at step 118, was different than the selected single modulation scheme used at step 128. This removes any adverse effect that might be caused by data in an unreliable burst. The demodulated bursts are then de-interleaved at step 136, and finally, the four received bursts are channel decoded at step 138 using the de-interleaved data in the demodulated bursts and using the soft values, as calculated at step 132 and adjusted at step 134.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for blind detection of modulation in a wireless telecommunication system, comprising the steps of:

transmitting a plurality of bursts over a radio interface using a first modulation scheme;

receiving the plurality of bursts;

calculating modulation detection statistics for each of the plurality of received bursts;

detecting a modulation scheme for each of the plurality of received bursts based on an evaluation of the modulation detection statistics;

determining that the modulation scheme detected for at least one of the plurality of received bursts comprises a second modulation scheme and that the modulation scheme detected for at least one other of the plurality of received bursts comprises the first modulation scheme;

identifying a single modulation scheme that was most likely used in modulating the plurality of bursts; and decoding the plurality of received bursts, wherein said decoding includes processing at least one of the plurality of received bursts for which the detected modulation scheme differs from the identified single modulation scheme to adjust the effect of said at least one received burst having a different detected modulation scheme.

2. The method of claim 1, wherein the identified single modulation scheme comprises the first modulation scheme.

3. The method of claim 1, wherein the transmission of the plurality of bursts is conducted in accordance with Enhanced Data rates for Global Evolution (EDGE) technology.

4. The method of claim 1, wherein the first modulation scheme comprises gaussian minimum shift keying (GMSK).

5. The method of claim 1, wherein the first modulation scheme comprises eight phase shift keying (8-PSK).

6. The method of claim 1, wherein the first modulation scheme comprises quadrature phase shift keying (QPSK).

7. The method of claim 1, wherein the modulation detection statistics for each received burst comprise a correlation quality measure between a training sequence in the received burst and a known training sequence.

8. The method of claim 7, further comprising the step of de-rotating the training sequence in each received burst prior to calculating the correlation quality measure for the received burst.

9. The method of claim 1, wherein the step of identifying a single modulation scheme further comprises identifying a modulation scheme detected for a majority of the plurality of bursts.

10. The method of claim 9, wherein the plurality of bursts consists of four bursts, the detected modulation scheme for three of the bursts comprising the first modulation scheme.

11. The method of claim 1, wherein the step of identifying a single modulation scheme further comprises the steps of:

determining that no single modulation scheme was detected for a majority of the bursts;

evaluating additional modulation detection information to identify a single modulation scheme.

12. The method of claim 11, wherein the plurality of bursts consists of four bursts, the detected modulation scheme for two of the bursts comprising the first modulation scheme and the detected modulation scheme for the other two of the bursts comprising the second modulation scheme.

13. The method of claim 11, wherein the additional modulation detection information comprises a correlation quality measure for each burst, each said correlation quality measure indicating a degree of correlation between a training sequence in the received burst and a known training sequence.

14. The method of claim 11, wherein the additional modulation detection information comprises historical data relating to modulation schemes detected for at least one burst preceding said plurality of bursts.

15. The method of claim 11, wherein the additional modulation detection information comprises data indicating a bias in favor of at least one particular modulation scheme.

16. The method of claim 1, wherein said processing includes the steps of:

calculating a plurality of soft values for each of the plurality of received bursts, each said soft value indicating a probability that a corresponding symbol in the received bursts has a particular value;

altering the plurality of soft values for the at least one of the plurality of received bursts for which the modulation detection statistics indicate transmission using the second modulation scheme; and performing said decoding using the plurality of soft values, as altered during the step of altering.

17. The method of claim 16, wherein the step of altering includes altering each of the plurality of soft values for the at least one of the plurality of received bursts for which the detected modulation scheme comprises the second modulation scheme to indicate that all possible values for the corresponding symbol are equally probable.

18. The method of claim 16, wherein said processing includes the step of altering the number of bits in the at least one of the plurality of received bursts for which the detected modulation scheme differs from the identified single modulation scheme.

19. The method of claim 1, wherein said processing to adjust the effect of said at least one received burst having a different detected modulation scheme comprises reducing the effect of said at least one received burst having a different detected modulation scheme.

20. A wireless data communication system, comprising:

a receiving station for receiving a plurality of burst signals transmitted over an air interface and for implementing blind detection of modulation schemes used to. transmit said data signals, wherein the receiving station comprises:

at least one channel estimation device for calculating modulation detection statistics for each of the plurality of received burst signals;

a modulation detection unit for analyzing the modulation detection statistics for each received burst signal to identify a probable modulation scheme for each received burst signal; and a modulation correction unit operating to determine whether all of the identified probable modulation schemes for the plurality of received burst signals match, wherein, if all of the identified probable modulation schemes do not match, the modulation correction unit further operates to identify a single modulation scheme most likely used in modulating the plurality of burst signals.

21. The system of claim 20, wherein the identification of the single modulation scheme comprises determining that a majority of the identified probable modulation schemes match and selecting the probable modulation scheme identified for a majority of the plurality of burst signals as the identified single modulation scheme.

22. The system of claim 20, wherein the identification of the single modulation scheme comprises evaluating additional modulation detection information to select the identified single modulation scheme.

23. The system of claim 22, wherein the receiving station further comprises:

a first de-rotation device for de-rotating a training sequence in each received burst signal according to a bit rotation used for gaussian minimum shift keying (GMSK) modulated transmissions;

a second de-rotation device for de-rotating a training sequence in each received burst signal according to a bit rotation used for eight phase shift keying (8-PSK) modulated transmissions; and wherein the at least one channel estimation device includes:

a first channel estimation device for calculating first correlation quality measures between a known training sequence and the received training sequences as de-rotated by the first de-rotation device; and a second channel estimation device for calculating second correlation quality measures between the known training sequence and the received training sequences as de-rotated by the second de-rotation device.

24. The system of claim 23, wherein the evaluation of the additional modulation detection information comprises evaluating the first and second correlation quality measures for the plurality of burst signals.

25. The system of claim 22, wherein the additional modulation detection information includes historical modulation detection statistics for at least one burst signal that precedes the plurality of burst signals.

26. The system of claim 22, wherein the additional modulation detection information includes data identifying a bias toward a particular modulation scheme.

27. The system of claim 20, further comprising:

an equalizer for analyzing the burst signals to generate a most probable symbol sequence for each burst signal and to generate a plurality of soft values for each burst signal, each soft value associated with a symbol in the most probable symbol sequence and identifying a probability that symbol has a particular value; and wherein the modulation correction unit receives each most probable symbol sequence and each plurality of soft values, the modulation correction unit operating to adjust the plurality of soft values for at least one burst sequence for which the identified probable modulation scheme does not match the identified single modulation scheme.

28. The system of claim 27, further comprising a channel decoder for decoding the plurality of burst signals using each most probable symbol sequence and each plurality of soft values, as adjusted by the modulation correction unit.

29. The system of claim 20, further comprising a network side of the wireless data communication system, the network side comprising:

a modulator for modulating the plurality of burst signals prior to the transmission over the air interface, the plurality of burst signals modulated in accordance with a modulation scheme that corresponds to current channel conditions of a radio channel used for communicating the plurality of burst signals between the network side and the receiving station; and a transmitter for transmitting the plurality of modulated burst signals over the air interface.

30. The system of claim 29, wherein the plurality of burst signals are modulated and transmitted in accordance with Enhance Data rates for Global Evolution (EDGE) technology.

31. The system of claim 29, wherein the identified single modulation scheme matches the modulation scheme used by the modulator.

32. The system of claim 20, further comprising a demodulator for demodulating each of the plurality of received burst signals in accordance with the corresponding identified probable modulation scheme.

33. The system of claim 20, wherein the modulation correction unit further operates to adjust the number of bits in at least one burst sequence for which the identified probable modulation scheme does not match the identified single modulation scheme.

* * * * *